UNITED STATES PATENT OFFICE.

ALBERT BUSCH, OF BRUNSWICK, GERMANY.

PROCESS OF MANUFACTURING NEW COMPOUNDS OF PROTEIDS WITH BISMUTH IODID.

No. 898,311.　　　　　Specification of Letters Patent.　　　Patented Sept. 8, 1908.

Application filed August 16, 1906. Serial No. 330,895. (Specimens.)

*To all whom it may concern:*

Be it known that I, ALBERT BUSCH, doctor of philosophy, a chemist and a subject of the reigning Prince of Brunswick, residing at 2 Blücherstrasse, in the city of Brunswick, in the Duchy of Brunswick, German Empire, have invented a certain new and useful Process of Manufacturing New Compounds of Albuminoids or Proteids with Bismuth Iodid, of which the following is a specification.

Notwithstanding the many attempts which have been made to substitute preparations containing organic combinations of iodin for the alkali iodids in therapeutics, such preparations have been but little used. This is chiefly due to the fact that the majority of these preparations of iodin contain the iodin either too loosely combined, in which case their action is too energetic, or in so firm a molecular form of combination that they cannot be decomposed by the organism and the iodin is not absorbed. The alkali iodids, when internally administered, are easily absorbed by all mucous membranes and appear very quickly in the urine, sputum and the majority of the fluids of the body. When administered, therefore, these iodids attack particularly the stomach in an undesirable manner, so that during protracted use disorders of the digestion ensue; on the other hand, in many cases, development of iodism prevents prolonged administration of alkali iodids.

According to the present invention, new compounds of albuminoids or proteids with bismuth iodid are obtained, which pass almost unattacked through the stomach, by heating the well known precipitate of bismuth iodid and albuminous matter (*cf.* Hammarsten, *Physiological Chemistry* III ed. Wiley & Sons 1902 p. 26) for some time, say 8-10 hours, at temperature between 100 and 130 centigrades. The precipitate aforesaid, when produced in acid, for instance nitric acid solution, is in a fresh state very easily to be decomposed and split up into its components even by washing with distilled water, the color of the precipitate changing from orange to white. On the other hand, when for some time heated at temperatures varying between 100 and 130 centigrades, the precipitate is turned into a constant complex compound of acid character which is no longer decomposed by water and diluted acid liquids, but being an acid itself, is readily dissolved by alkaline liquors, such as diluted solutions of carbonate of sodium, caustic soda etc. By heating the well known precipitate of bismuth iodid and albuminoids or proteids the former is not only dried but a thoroughly new compound with quite new properties is formed and this is what I claim as my invention.

The new compounds of albuminoids or proteids with bismuth iodid, as I have said above, are very little soluble in water and diluted acids, while they are readily dissolved by alkaline liquids, such as carbonate of sodium, caustic soda and the like. Owing to this chemical behavior, the compounds in question do not injure the stomach when internally administered, being almost insoluble in the gastric juice but are on the other hand readily decomposed in the alkaline pancreatic juice. In this alkaline solution the iodin is found to be in the form of alkali iodid. Therefore they are particularly adapted to be administered in cases where a prolonged administration of small doses of iodin is required.

The following examples may show how the new compounds can be obtained.

1. 10 kilos of sodium casein are dissolved in 250 liters of water with aid of heat and the solution is allowed to cool down. On the other hand, 0.4 kilo of bismuth subnitrate (magisterium bismuthi) is dissolved in 10 kilos of boiling water with addition of the necessary quantity of nitric acid. This solution is also cooled and added gradually while stirring well, to a solution of 1.5 kilos of potassium iodid in the minimum quantity of water and the yellowish red, quite bright mixture is united, while stirring well, with the casein solution. An orange curdy precipitate is produced, which is washed with a small quantity of cold pure water and pressed. It is then heated for some time, say 8-10 hours at 100°-130° C. The powdered product is a red-orange powder of the characteristic qualities mentioned above.

2. 10 kilos of dry white of egg are dissolved in 250 liters of water and to the solution is added, while stirring, the same quantity of a solution of potassio-bismuth iodid prepared as described in Example 1. An orange precipitate is formed, the quantity of which may be increased by heating. After cooling the precipitate is filtered off, washed with a small quantity of cold water, pressed and dried for some time, say 8–10 hours at 100–130° C. The product is a yellowish powder.

In both these examples the proportion of potassio bismuth iodid may be varied within certain limits without essentially altering the character of the precipitate, apart from its percentage of bismuth and iodin. Instead of casein or white of egg any other albuminous matter, precipitable by the double salt aforesaid, may be used. Criterion that the new compound of bismuth iodid and albuminous matter has been formed will be found in the fact that the product after heating has turned insoluble and undecomposable by water and dilute acids.

The heating of the precipitate may be performed in the usual manner in an air bath with or without diminished pressure, or the previously dried precipitate may be heated to the required temperatures in presence of non-aqueous indifferent liquids, viz: toluene or xylene, either in a closed vessel or in an open vessel having a reflux apparatus.

What I claim and desire to secure by Letters Patent of the United States is:

1. As a new article of manufacture an organic chemical compound of albuminous matter with bismuth iodid, sparingly soluble in water and diluted acid liquids but easily decomposable in dilute alkaline liquids, producible by heating the well known precipitate of the above ingredients for some time at raised temperatures above 100 centigrades, say from 100–130° C.

2. The method of producing a stable organic compound of bismuth iodid which consists in retaining a precipitate of bismuth iodid and albuminous matter at a temperature of 100° C. to 130° C. for a period of eight to ten hours.

3. The method of producing a stable compound of bismuth iodid, which consists in heating the precipitate of bismuth iodid and albuminous matter, at temperatures from 100°–130° C. until the compound formerly decomposable by water and dilute acids has become undecomposable and insoluble in such liquids.

4. As a new article of manufacture, a chemical compound of bismuth iodid with albuminous matter sparingly soluble in water and dilute acids, but easily decomposable in dilute alkaline liquids, produced by heating the precipitate of bismuth iodid and albuminous matter at temperatures from 100°–130° C.

In witness whereof, I have hereunto signed my name in the presence of two subscribing witnesses.

ALBERT BUSCH.

Witnesses:
  WILHELM BORSUM,
  JULIUS SECHEL.